United States Patent [19]
Yamamoto et al.

[11] Patent Number: 6,030,540
[45] Date of Patent: Feb. 29, 2000

[54] METHOD FOR PRODUCING TAPERED WAVEGUIDE

[75] Inventors: Hiroyuki Yamamoto, Kashihara; Yoshio Yoshida, Nara; Yukio Kurata, Tenri, all of Japan

[73] Assignee: Sharp Kabushiki Kaisha, Osaka, Japan

[21] Appl. No.: 08/900,164

[22] Filed: Jul. 28, 1997

[30] Foreign Application Priority Data

Jul. 29, 1996 [JP] Japan ...................................... 8-199462

[51] Int. Cl.⁷ ................................ B44C 1/22; G02B 6/10
[52] U.S. Cl. ................................ 216/47; 216/24; 216/41; 385/131; 385/132
[58] Field of Search ................................ 216/24, 41, 47; 385/131, 132

[56] References Cited

U.S. PATENT DOCUMENTS

| | | | |
|---|---|---|---|
| 4,256,816 | 3/1981 | Dunkleberger | 430/11 |
| 5,749,132 | 5/1998 | Mahapatra et al. | 29/25.35 |
| 5,764,842 | 6/1998 | Aoki et al. | 385/131 |

FOREIGN PATENT DOCUMENTS

| | | |
|---|---|---|
| 4-55802 | 2/1992 | Japan . |
| 6-82644 | 3/1994 | Japan . |
| 7-134216 | 5/1995 | Japan . |

OTHER PUBLICATIONS

N. Yamaguchi, and Y. Kokubun, "Low–Loss Spot–Size Transformer by Dual Tapered Waveguids (DTW–SST)", Journal of Lightwave Technology, vol. 8, No. 4, Apr. 1990, pp. 587–593.

*Primary Examiner*—Randy Gulakowski
*Assistant Examiner*—Shamim Ahmed
*Attorney, Agent, or Firm*—Dike, Bronstein, Roberts & Cushman, LLP; David G. Conlin

[57] ABSTRACT

A method for producing a tapered waveguide is produced using an undercut-type shadow mask having an overhanging part. The shadow mask includes a photoresist layer having the overhanging part and a metal layer for supporting the photoresist layer on a substrate. After the shadow mask is provided on the substrate, film-forming particles are caused to jump from above the shadow mask toward the substrate, thereby forming a dielectric film having a tapered part on the substrate. Then, the shadow mask is removed together with the film-forming particles thereon by lift-off. Then, an optical waveguide is formed on the substrate so as to cover the dielectric film having the tapered part. The thickness of the metal layer is preferably in the range of about 0.1 to 10 $\mu$m and more preferably about 1 $\mu$m.

10 Claims, 8 Drawing Sheets

METHOD FOR PRODUCING TAPERED WAVEGUIDE

BACKGROUND OF THE INVENTION

1. Field of the Invention

The present invention relates to a method for producing an optical waveguide having a tapered part (hereinafter, referred to as a "tapered waveguide"), and in particular, to a method for producing an optical waveguide having a tapered part in an optical integrated circuit formed on a substrate.

2. Description of the Related Art

Recently, optical components are being more and more reduced in size and increased in the degree of integration. Processing technologies in the sub-micron order have been established. In conventional film formation or etching, it is routine to uniformize the processing rate of the sample, the film thickness, and the etching depth in a processed plane of the sample to a maximum possible extent. In other words, processing is performed in a plane parallel to the surface of the substrate of the sample so as to minimize non-uniformity in the processing rate of the plane.

In some cases, the film forming rate or the etching rate of the film on a certain part of the substrate is intentionally made different from the rest of the substrate so as to form a tapered part having a surface inclined with respect to the surface of the substrate. Among various devices produced using such a technology, the tapered part of the optical waveguide is effectively utilized for changing the path of light to the thickness direction of the substrate with no waste, or for allowing the light to pass with no waste through the border of a plurality of areas having different effective refractive indices.

FIG. 4A is a plan view of a mode splitter 41 (also referred to as "waveguide element") to which the tapered waveguide disclosed in Japanese Laid-Open Publication No. 6-82644 is applied. FIG. 4B is a cross sectional view thereof.

The waveguide element 41 includes two waveguide areas A and B having different thicknesses from each other, while the thickness of each of the waveguide areas A and B is uniform. The waveguide areas A and B are combined by a tapered part C having a surface which is inclined sufficiently slowly with respect to the wavelength of the light. The thickness of the tapered part C continuously changes from the thickness of the waveguide area A to the thickness of the waveguide area B.

TM mode light and TE mode light incident on the tapered part C at a certain incident angle are refracted to make an angle e therebetween due to the difference in equivalent refractive indices of the waveguide areas A and B.

The tapered part C of the waveguide element 41 can be formed by processing methods such as, for example, dry etching, wet etching, ion milling or machining. Alternatively, the tapered part C can be formed using shadow masking during formation of the waveguide element 41 using sputtering, vapor deposition, CVD (chemical vapor deposition) or the like. Shadow masking refers to covering an area of a layer and depositing another layer having a tapered part using particles which jump to the covered area.

In FIG. 4B, reference numeral 46 denotes a substrate having a refractive index of 1.47, reference numeral 45 denotes a buffer layer having a refractive index of 2.3, and reference numeral 44 denotes a waveguide layer having a refractive index of 1.52.

Hereinafter, formation of a tapered part using etching and shadow masking will be described.

First, production of a tapered part using etching will be described with reference to FIGS. 5A through 5I. The method illustrated in FIGS. 5A through 5I is disclosed in Japanese Laid-Open Publication No. 4-55802.

A Si substrate 51 shown in FIG. 5A is treated by thermal oxidation to form a first $SiO_2$ film 52 on the Si substrate 51 as shown in FIG. 5B. On the first $SiO_2$ film 52, a second $SiO_2$ film 53 is formed as shown in FIG. 5C. A photoresist 54 is formed on the second $SiO_2$ film 53 as shown in FIG. 5D, and then the photoresist 54 is patterned as shown in FIG. 5E.

Next, wet etching is performed using the patterned photoresist 54 as a mask as follows. The first and second $SiO_2$ films 52 and 53 are etched using an appropriate etchant. The second $SiO_2$ film 53, which has a higher etching rate than that of the first $SiO_2$ film 52, is etched faster than the first $SiO_2$ film 52. The first $SiO_2$ film 52, which is below the second $SiO_2$ film 53, is slowly etched. In detail, the first $SiO_2$ film 52 is etched by the amount which is in proportion to the time period during which the first $SiO_2$ film 52 is exposed to the etchant. An area of the first $SiO_2$ film 52 which is not covered by the second $SiO_2$ film 53 is etched deep, and an area of the first $SiO_2$ film 52 which is covered by the second $SiO_2$ film 53 is etched shallow. As a result, the etched part of the first $SiO_2$ film 52 results in a tapered part 55 as shown in FIG. 5F.

After the photoresist 54 is removed as shown in FIG. 5G and the second $SiO_2$ 53 is also removed as shown in FIG. 5H, an optical waveguide 56 is formed on the substrate 51 so as to cover the first $SiO_2$ film 52 as shown in FIG. 5I. The first $SiO_2$ film 52 having the tapered part 55 at one end thereof functions as a buffer layer in an area for changing the propagation direction of light in the optical waveguide 56.

With reference to FIGS. 6A and 6B, the principle of forming a tapered part using shadow masking will be described. Shadow masking is disclosed in, for example, Journal of Lightwave Technology, Vol. 8, No. 4, pp. 587–593, (April, 1990). FIG. 6A shows a mask 61 disposed above a substrate 63, and FIG. 6B is a partial cross sectional view of the mask 61.

As shown in FIG. 6A, the metal mask 61 is held above the substrate 63 while a certain gap is kept between the mask 61 and the substrate 63 by a spacer 62. When film-forming particles are caused to jump from above the mask 61 toward the substrate 63, some particles enter the area covered by the mask 61. Thus, the thickness of a film 65 formed by the particles changes on the area of the substrate 63 right below the end of the mask 61. In detail, the film 65 has a tapered part 64, the thickness thereof decreasing toward the area covered by the mask 61. The film 65 is also formed on the mask 61.

The shape of the tapered part 64 is determined by, for example, the cross sectional shape of the mask 61, the distance between the mask 61 and the substrate 63, the size of the source of the particles, and the distance between the source and the substrate 63. Since the particles jump obliquely as well as vertically with respect to the surface of the substrate 63, the shape of the tapered part 64 covered by the mask 61 is unclear.

FIG. 7 shows another method for producing a tapered part using shadow masking. The method shown in FIG. 7 is disclosed by Japanese Laid-Open Publication No. 7-134216.

As shown in FIG. 7, a substrate 72 having a patterned photoresist 71 thereon is supported on a sample table 76 in an inclined manner. The sample table 76 is provided below a film formation particle source 75 of a film forming apparatus. When the substrate 72 is supported on the sample table 76 in the inclined manner, the substrate 72 is not lying against the sample table 76 which is cooled, and thus the substrate 72 is not sufficiently cooled. In order to compensate for such an inconvenience, a highly thermally conductive, right-angled triangular metal jig 74 having a surface inclined with respect to the surface of the sample table 76 is provided on the sample table 76, and the substrate 72 is provided on the metal jig 74 with a vacuum grease provided therebetween.

The patterned photoresist 71 is provided on a part of the substrate 72, so that an area of the substrate 72 which is not covered by the photoresist 71 is underneath the photoresist 71 with respect to the direction of the particle flow.

When film formation is performed in such a state, film-forming particles 79 jumping from the film formation particle source 75 enter a surface of the photoresist 71 formed on the substrate 72 obliquely. Thus, a film 77 formed on the substrate 72 has a tapered part on an area of the substrate 72 shadowed by the photoresist 71. On the photoresist 71 also, a film 78 is formed.

After the film formation, the photoresist 71 and the film 78 on the photoresist 71 are removed by lift-off, thus leaving the film 77 on the substrate 72. In detail, the photoresist 71 is dissolved by a solvent such as acetone or the like, and thus removed together with the film 78 thereon. As a result, the film 77 having the tapered part is obtained.

FIGS. 8A through 8H illustrate another method for producing a tapered part using shadow masking. The method shown in FIGS. 8A through 8H is disclosed by the U.S. Pat. No. 4,256,816.

By the method shown in FIGS. 8A through 8H, a shadow mask having three layers is used. The shadow mask includes, for example, two photoresist layers sandwiching an Al layer therebetween.

As shown in FIG. 8A, a substrate 80 is coated with a bottom photoresist layer 82 and dried. Then, the entire surface of the assembly of the substrate 80 and the bottom photoresist layer 82 is exposed to light. Next, as shown in FIG. 8B, an Al layer 84 having a thickness of 5 to 20 nm is formed on the bottom photoresist layer 82. The Al layer 84 acts as a protective layer for preventing the bottom photoresist layer 82 from dissolving while a top photoresist layer 86 is formed.

As shown in FIG. 8C, the Al layer 84 is coated with the top photoresist layer 86 and dried. Then, the top photoresist layer 86 is selectively exposed to light using a light blocking mask 88. Next, as shown in FIG. 8D, the top photoresist layer 86 is developed to form an opening 89 therein. Then, Al layer 84 is treated by etching and the like, using the top photoresist layer 86 having the opening 89 as a mask. Thus, as shown in FIG. 8E, an opening 89a which is larger than the opening 89 is formed in the Al layer 84. The bottom photoresist layer 82 is partially removed by an etchant through the opening 89a, thereby forming an opening 89b which is larger than the opening 89a in the bottom photoresist layer 82. A side wall 81 of the opening 89b in the bottom photoresist layer 82 is hidden below the top photoresist layer 86. Such a type of shadow mask is referred to as an "undercut-type" or "T-shaped" shadow mask.

By such a method, the opening 89a formed in the Al layer 84 and the opening 89b formed in the bottom photoresist layer 82 are patterned by transfer of the pattern of the opening 89 formed in the top photoresist layer 86. Accordingly, formation of the openings 89a and 89b does not require any additional masks or positioning.

When forming a thin film 90 of metal or the like using the undercut-type three-layer shadow mask produced in the above-described manner, film-forming particles which have passed through the openings 89, 89a and 89b are deposited on the substrate 80 as shown in FIG. 8G. By removing unnecessary layers on the substrate 80, the metal thin film 90 having a desired pattern is obtained as shown in FIG. 8H. The metal thin film 90 has a trapezoidal cross section with two sides thereof being tapered.

Film formation performed by depositing film-forming particles, e.g., vapor deposition, sputtering, or CVD are advantageous in having a wider selection of materials and thus being more widely adaptable for optical waveguides of various specifications, when compared with film formation performed by thermal oxidation. However, $SiO_2$ films produced by deposition of film-forming particles have such disadvantages compared with the $SiO_2$ film formed by thermal oxidation that (1) grain boundaries are more easily generated, (2) the surface is generally rougher and more porous; and (3) the state of the tapered surface is deteriorated by etching. For example, the surface roughness is significantly increased by etching. Due to these disadvantages, a tapered waveguide formed by film formation performed by depositing film-forming particles has a greater optical loss than that of the tapered waveguide obtained by processing the $SiO_2$ film formed by thermal oxidation.

According to the method illustrated by FIGS. 5A through 5I, after the second $SiO_2$ film 53 used for controlling the etching rate is removed, a step portion is generated between the tapered part of the first $SiO_2$ film 52 which is not covered by the second $SiO_2$ film 53 and the flat area of the first $SiO_2$ film 52 which was covered by the second $SiO_2$ film 53, due to the difference in etching rate between the first $SiO_2$ film 52 and the second $SiO_2$ film 53. The step portion significantly affects the optical loss of the tapered waveguide.

According to the method illustrated by FIGS. 6A and 6B, the resultant tapered part obtained by this method is not sufficiently small to reduce the size of the optical integrated circuit including the tapered waveguide or to raise the degree of integration. An overhanging part 61a of the mask 61 has a length LH of about 1 mm or more, and a gap W between the overhanging part 61a and the substrate 63 is also 1 mm or more. Accordingly, the tapered part 64 has a length LT of several millimeters. Moreover, according to this method, attachment and detachment of the shadow mask to and from the substrate 63, and washing of the substrate 63, make mass production difficult.

According to the method shown in FIG. 7, the tapered part is formed only on an area of the substrate 72 which is shadowed by the photoresist 71. Moreover, the thickness and the refractive index of the film used in the tapered waveguide are not uniform within one optical waveguide or within one pattern area of the optical waveguide. Due to such non-uniformity, the number of substrates (wafers) which can be processed at one time is limited, and device characteristics vary from device to device. The method illustrated in FIG. 7 requires a special apparatus for cooling the substrate 72.

The method shown in FIGS. 8A through 8H involves the following problems.

Formation of the protective layer 84 in a vacuum state restricts the material selection. Even formation of the protective layer by spin-coating or other more productive methods in order to broaden the material selection is not appropriate because a protective material containing a solvent dissolves the bottom photoresist layer 82.

When the baking temperature of the bottom photoresist layer 82 is raised in order to make the bottom photoresist layer 82 more resistant against the solvent, developing and removal of the bottom photoresist layer 82 become difficult. The bottom photoresist layer 82 also restricts the method of formation of the protective layer in a vacuum state if the protective layer 84 is formed by, for example, sputtering; the reason being the property of the surface of the bottom photoresist layer 82 is changed by plasma and thus developing and removal of the bottom photoresist layer 82 become difficult.

Since the bottom photoresist layer 82 entirely exposed to light exists below the protective layer 84, optical reaction of the bottom photoresist layer 82 is promoted excessively during the baking of the top photoresist layer 86, causing foaming or delamination of the protective layer 84. It is difficult to provide a set of conditions (exposure conditions, baking conditions, resist material) for preventing such a phenomenon. Thus, the top and bottom photoresist layers 86 and 82 cannot be processed with satisfactory reproducibility.

As the material of the protective layer 84, Al is optimum in consideration of suitability with the IC process. However, an alkaline solution, which is most often used today for developing the top photoresist layer 86, etches the Al layer when developing the top photoresist layer 86. As a result, the shape of the shadow mask cannot be reproduced.

SUMMARY OF THE INVENTION

According to one aspect of the present invention, a method for producing a tapered waveguide, includes the steps of forming an undercut-type shadow mask having an overhanging part on a substrate; causing film-forming particles to jump from above the shadow mask toward the substrate, thereby forming a dielectric film having a tapered part on the substrate; removing the shadow mask together with the film-forming particles thereon by lift-off; and forming an optical waveguide on the substrate so as to cover the dielectric film having the tapered part. The undercut-type shadow mask includes a photoresist layer having an overhanging part and a metal layer having a thickness of in the range of about 0.1 to 10 $\mu$m for supporting the photoresist layer above the substrate.

In one embodiment of the invention, the metal layer has a thickness of about 1 $\mu$m.

In one embodiment of the invention, the photoresist layer has a thickness of in the range of 0.5 to 50 $\mu$m.

In one embodiment of the invention, the photoresist layer has a thickness of about 10 $\mu$m.

In one embodiment of the invention, the method further includes the step of thermally deforming the photoresist layer to reduce the thickness of a tip of the overhanging part and to slowly curve a top part of the overhanging part.

In one embodiment of the invention, the step of forming the shadow mask includes the steps of forming the metal layer on the substrate; forming the photoresist layer having the overhanging part on the metal layer; and etching the metal layer by an etchant formed of one of an acid and a mixture of an acid, using the photoresist layer as a mask.

In one embodiment of the invention, the metal layer is formed of aluminum.

In one embodiment of the invention, the metal layer is formed of aluminum and the etchant is formed on a material mainly containing phosphoric acid.

In one embodiment of the invention, the step of forming the dielectric film includes the steps of placing the substrate having the shadow mask thereabove on a movable sample table; and causing the film-forming particles to jump toward the sample table while moving the sample table so as to cause the film-forming particles to jump toward the substrate in random directions.

According to another aspect of the invention, a method for producing a tapered waveguide includes the steps of forming a metal layer on a substrate; forming a patterned photoresist layer on the metal layer; etching the metal layer by an etchant formed of one of an acid and a mixture of an acid, using the photoresist layer as a mask, thereby forming an undercut-type shadow mask having an overhanging part on the substrate; causing film-forming particles to jump from above the shadow mask toward the substrate, thereby forming a dielectric film having a tapered part on the substrate; removing the shadow mask together with film-forming particles thereon by lift-off; and forming an optical waveguide layer on the substrate so as to cover the dielectric film having the tapered portion.

According to the present invention, an undercut-type shadow mask including a photoresist layer having an overhanging part and a metal layer having a thickness of about 1 $\mu$m for supporting the photoresist layer above the substrate is used. Thus, the distance between the photoresist layer and the substrate is sufficiently small, which allows the tapered waveguide formed of a dielectric layer to be shorter. Therefore, the optical integrated circuit including the tapered waveguide can be reduced in size and the degree of integration thereof can be improved.

The tapered waveguide is formed by causing the film-forming particles to jump from above the shadow mask toward the substrate. For such a method, most of the vacuum film forming methods are usable, and thus the material selection for the dielectric film in the optical waveguide is broadened.

The tapered part of the waveguide is formed by using a shadow mask has advantages over the tapered part formed by etching, such as having more uniform thickness and refractive index, and being smoother with no step portion as evidenced by a lower surface roughness. Accordingly, the optical loss of the tapered waveguide is significantly reduced.

Since the overhanging part of the shadow mask is as thick as about 10 $\mu$m, the overhanging part is not broken by the formation of the tapered part of the waveguide. Thus, the device characteristics and the production yield are improved.

In the case where the patterned photoresist is thermally deformed to reduce the thickness of the tip of the overhanging part and slowly curve the top of the overhanging part, the adverse affect of the thickness of the photoresist layer on the tapered part of the dielectric film is restricted. Thus, the optical characteristics of the tapered waveguide can be improved.

In the case where the metal layer for supporting the overhanging part is formed of Al, the tapered part can be formed using the semiconductor process. Thus, the production method of an optical integrated circuit including the tapered waveguide is simplified, which reduces production cost.

For forming the undercut-type shadow mask, the metal layer provided between the photoresist layer and the substrate is etched away by an etchant formed of an acid or a mixture including an acid, which does not etch the metal layer. Accordingly, the substrate is prevented from being damaged. Specifically, in the case where an etchant mainly containing phosphoric acid is used, the tapered waveguide is produced in a stable manner. Therefore, the device characteristics are stabilized to improve reliability.

In the case where the deposition of the film-forming particles is performed while the sample table is rotated so as to cause the film-forming particles to jump in random directions, the position where the tapered part is formed is not restricted by the position of the film formation particle source. Thus, the tapered part can be formed at any position along the periphery of the opening of the photoresist layer.

Owing to the above-described effects, dispersion of the device characteristics, caused by the non-uniform thickness and refractive index of the dielectric film within one optical integrated circuit, or within one pattern area of the optical integrated circuit, is restricted to improve the reliability of the optical waveguide.

Since the position where the tapered part is formed is not restricted by the position of the film formation particle source as described above, the number of wafers which can be processed at the same time is increased. Thus, the productivity is improved and production cost is reduced. Since the tapered part can be formed at an arbitrary position regardless of the direction in which the film-forming particles extend, the size of the optical integrated circuit including the tapered waveguide is reduced and the performance thereof is improved.

Thus, the invention described herein makes possible the advantages of providing (1) a method for producing a tapered waveguide which uses a shadow mask which has a simple structure and can be formed by various methods so as to prevent increase in surface roughness of a tapered part as caused by etching and which uses deposition of film-forming particles so as to restrict the non-uniformity in thickness and refractive index of the tapered waveguide; and (2) a method for producing a tapered waveguide suitable for mass production, by which the position at which a tapered part is formed is not limited by the position of a film formation particle source.

These and other advantages of the present invention will become apparent to those skilled in the art upon reading and understanding the following detailed description with reference to the accompanying figures.

DESCRIPTION OF THE PREFERRED EMBODIMENTS

Figure 1A:
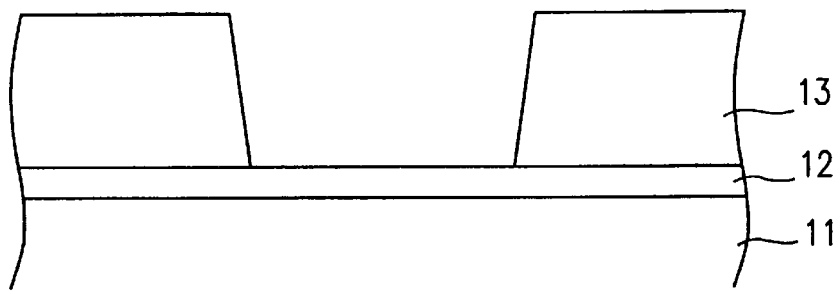
FIGS. 1A through IF are cross sectional views illustrating a method for producing a tapered waveguide in a first example according to the present invention.

Hereinafter, the present invention will be described by way of illustrative examples with reference to the accompanying drawings. In the following examples, identical elements bear identical reference numerals, and description thereof will not be repeated.

EXAMPLE 1

With reference to FIGS. 1A through 1F, a method for producing a tapered waveguide 101 in a first example according to the present invention will be described.

Figure 1B:
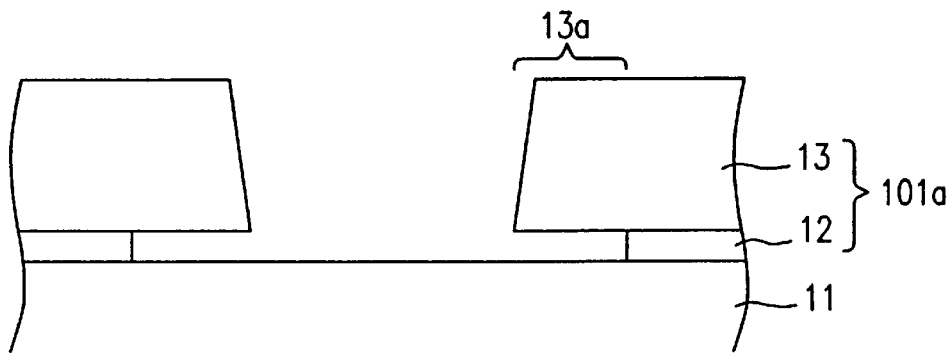
Figure 1C:
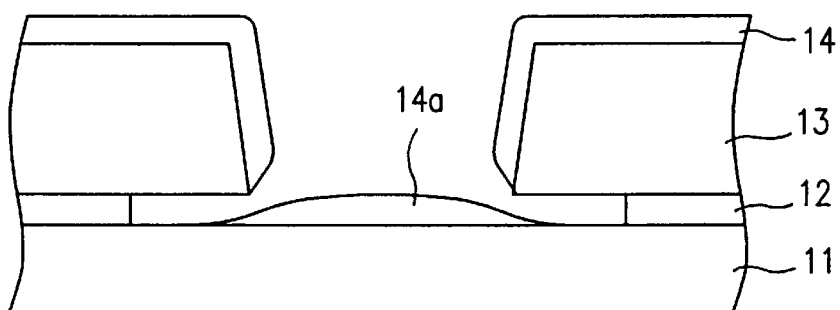
Figure 1D:
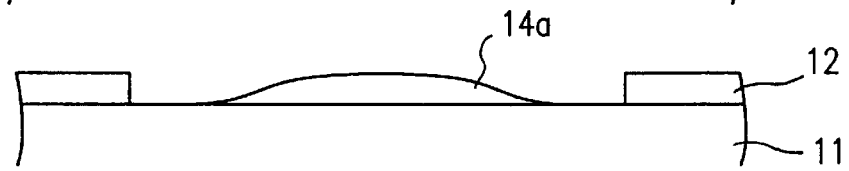
Figure 1E:
Figure 1F:
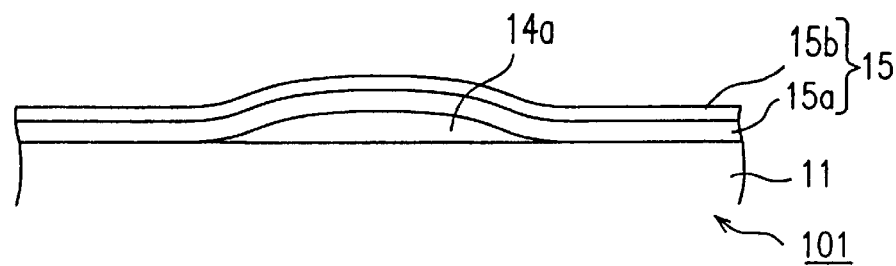

As shown in FIG. 1F, the tapered waveguide 101 in a completed state includes a substrate 11, a dielectric film 14a provided on the substrate 11 and having tapered parts on two ends thereof, and an optical waveguide layer 15 provided on the substrate 11 so as to cover the dielectric film 14a. The optical waveguide layer 15 includes a glass layer 15a and a $SiO_2$ layer 15b provided on the glass layer 15a.

In FIG. 1B, reference numeral 101a denotes a shadow mask having a T-shaped cross section, which includes a photoresist layer 13 having an overhanging part 13a and the metal layer 12 for supporting the photoresist layer 13 above the substrate 11.

The tapered waveguide 101 is produced in, for example, the following manner.

As shown in FIG. 1A, the substrate 11 is coated with the metal layer 12 having a thickness of about 1 μm. The substrate 11 is formed of, for example, a quartz glass plate, or a silicon wafer having an oxide film thereon as a result of thermal oxidation. The metal layer 12 can be formed of a metal which is etchable by an acid, for example, aluminum, copper, silver, or nickel. In the first example, the metal layer 12 is formed of aluminum. The metal layer 12 is coated with a photoresist of a relatively large thickness and baked. Then, the photoresist is patterned to be photoresist layers 13 having a desired planar shape.

The metal layer 12, which is used as a spacer layer between the substrate 11 and the photoresist layers 13, is formed by, for example, sputtering pure aluminum. Addition of Si, which is often used in a semiconductor process, is not preferable since an unnecessary substance remains as a result of etching. The metal layer 12 can also be formed by vapor deposition.

As the material of the spacer layer, aluminum is most preferable. The reasons are that aluminum, which provides satisfactory matching with a semiconductor process and is suitable for integration with the optical waveguide, is generally used as wires, and that the film formation and processing technologies thereof have been established.

As shown in FIG. 1B, the metal layer 12 is treated by wet etching to form the overhanging part 13a in each photoresist layer 13. The photoresist layer 13 needs to be formed to have a sufficient thickness to avoid breakage of the overhanging part 13a formed by wet etching. In the case where the overhanging part 13a is excessively thin, the overhanging part 13a is contacted to the substrate 11 due to the stress at the interface between the photoresist layer 13 and the metal layer 12 and inside the photoresist layer 13 and the surface tension of the etchant. As a result, the overhanging part 13a is broken. The thickness of the photoresist layer 13 is preferably in the range of 0.5 to 50 μm, more preferably in the range of 1 to 10 μm, and most preferably about 10 μm. The photoresist layer 13 having a thickness of 0.5 to 10 μm can be formed by performing spin-coating once. The photoresist layer 13 having a thickness of more than 10 μm can be formed by use of a film resist.

As the material of the photoresist layers 13, a positive-type photoresist, which is generally superior in resolution, is more suitable than a negative-type photoresist. In the case where a high resolution is not needed, a negative-type photoresist can be used. Exemplary photoresist material and processing conditions are described below.

Photoresist material: Positive-type photoresist AZ-P4620, Hoechst

Rotation rate of the substrate when the photoresist is spin-coated: 2,000 rpm

Pre-baking: heated in an oven at 90° C. for 30 min.

Exposure: 450 mJ/cm$^2$

Developing period: 5 min.

The photoresist is applied on the metal layer 12 by spin-coating after the surface of the metal layer 12 is treated by HMDS (hexamethyldisilazane). The treatment by HMDS is performed to enhance the adhesiveness between the photoresist and the metal layer 12.

The conditions for exposure and developing are set so as to leave no unnecessary photoresist on the metal layer 12. Due to such conditions, the metal layer 12 is slightly etched by the developer used for developing the photoresist. This causes no problem since the metal layer 12 is etched later.

The etchant used for etching the metal layer 12 shown in FIG. 1B is preferably a weak acid. Especially, an acid mainly containing phosphoric acid is preferable. For example, a mixture of nitric acid, phosphoric acid, acetic acid and water at a ratio of 1:16:2:1 is suitable.

When the metal layer 12 was etched by the above-described etchant at a temperature of 30° C. for 40 minutes, the metal layer 12 was etched by about 8 μm horizontally. As a result, the T-shaped shadow mask 101a having a relatively large horizontal part etched was obtained. When the ratio of the nitric acid was higher, the photoresist layers 13 cracked. When a different etchant containing hydrogen fluoride was used, the photoresist layers 13 were etched.

The substrate 11 and the photoresist can be formed of other materials than described above, in which case an etchant which does not etch the substrate 11 or the photoresist needs to be used. As an etchant, an acid or a mixture thereof is preferable since some alkaline solutions etch dielectric materials used for the substrate 11 and the photoresist.

The overhanging part 13a is formed by simply etching the metal layer 12 horizontally without requiring precise control of time or temperature. Accordingly, such a structure is easy to produce.

After etching, the dielectric film 14a is formed on the substrate 11 as shown in FIG. 1C. The dielectric film 14a can be formed of a material which can be used as an optical waveguide layer, e.g., Ta$_2$O$_5$ having a relatively high refractive index. As the formation method, RF sputtering can be used, for example. The film-forming particles are caused to jump to the photoresist layers 13 from almost right above the substrate 11. Since the film-forming particles jump in random directions, the particles come in below the overhanging part 13a. As a result, the dielectric film 14a having tapered parts is formed on the substrate 11. Dielectric films 14 are also formed on the photoresist layers 13.

The formation of the dielectric film 14a is performed in a method which causes the film-forming particles to jump in random directions. Such a method is used in order to restrict the non-uniformity in thickness and refractive index of the dielectric film 14a on one pattern area of the substrate 11, one substrate 11, or on a plurality of substrates 11 to be processed at the same time.

According to an exemplary relatively simple and effective method, a substrate or a plurality of substrates having the metal layer 12 and the photoresist layers 13 thereon are placed on a sample table, and the sample table is rotated and/or revolved. Exemplary conditions for film formation are shown below.

Target: Ta$_2$O$_5$

Gas flow rate: Ar (4SCCM)+O$_2$ (4SCCM)

Pressure in the film: about 0.8 Pa

RF power: 2.2 W/cm$^2$

Rotation rate of the sample table: 10 rpm

Film thickness and time: about 100 nm after 130 min

In actuality, the distance the film-forming particles jump to the substrate (10 cm or more) is several times longer than the mean free path (about 2 cm), and thus the film-forming particles collide with one another a plurality of times before reaching the substrate. In this manner, the area covered by the jumping film-forming particles is broadened. Accordingly, the film forming rate within one substrate or the plurality of substrates which are processed at the same time is made uniform, and the film-forming particles tend to jump in random directions.

According to such a method, a plurality of tapered parts inclined in different directions can be formed even when the film formation particle source is small with respect to the sample table. Furthermore, a plurality of substrates can be processed.

After the formation of the dielectric film 14a, the photoresist layers 13 are removed together with the dielectric films 14 thereon as shown in FIG. 1D. As shown in FIG. 1E, the metal layer 12 is removed. Then, as shown in FIG. 1F, the optical waveguide layer 15 is formed on the substrate 11 so as to cover the dielectric film 14a. Thus, the tapered waveguide 101 is produced.

The metal layer 12 is removed by treatment performing by an etchant containing phosphoric acid at a temperature of 30° C. for about 30 minutes.

The optical waveguide layer 15 can be formed by RF-sputtering an assembly of the #7059 glass (thickness: about 0.6 μm) and SiO$_2$ (thickness: about 0.1 μm) provided on the #7059 glass.

According to the method in the first example, an undercut-type shadow mask 101a including the relatively thick photoresist layer 13 (thickness: about 10 μm) having an overhanging part 13a and the metal layer 12 (thickness: about 1 μm) for supporting the photoresist layer 13 to be above the substrate 11 is used. A tapered part of the dielectric film is formed using the photoresist layer 13 as a mask while the film-forming particles are deposited on the substrate 11. For such a method, most of the vacuum film forming methods are usable, and thus the material selection for the dielectric film in the optical waveguide is broadened.

Since the tapered part is formed by a shadow mask 101a, not by etching using a mask, the tapered surface can be smoother with no step portion compared to the tapered surface obtained by etching as evidenced by a lower surface roughness. Accordingly, the optical loss of the completed tapered waveguide is significantly reduced, when compared with the tapered waveguide produced by etching.

Since the overhanging part 13a of the undercut-type shadow mask 101a is as thick as about 10 μm, the overhanging part 13a is not broken by the formation of the tapered part. Thus, the device characteristics and the production yield are improved.

In the case where the metal layer 12 for supporting the overhanging part 13a is formed of A1, the tapered part can be formed using the semiconductor process. Thus, production method of the tapered part is simplified, which reduces production cost.

In the case where the metal layer 12 is etched by an etchant mainly containing phosphoric acid, the photoresist layer 13 is prevented from being etched. Thus, the tapered waveguide is produced in a stable manner. Therefore, the device characteristics are stabilized to improve reliability.

In the case where the deposition of the film-forming particles is performed while the sample table is rotated so as to cause the film-forming particles to jump in random directions, the position where the tapered part is formed is not restricted by the position of the film formation particle source. Thus, the tapered part can be formed at any position along the periphery of the opening of the photoresist layer 13.

Owing to the above-described effects, dispersion of the device characteristics, caused by the non-uniform thickness and refractive index of the dielectric film within one tapered waveguide or within one pattern area of the tapered waveguide, is restricted, thus to improve the reliability of the integrated circuit including the tapered waveguide.

Since the position where the tapered part is formed is not restricted by the position of the film formation particle source as described above, the number of wafers which can be processed at the same time is increased. Thus, the productivity is improved and production cost is reduced. Since the tapered part can be formed at an arbitrary position regardless of the direction in which the film-forming particles jump, the size of the optical integrated circuit including the tapered waveguide is reduced and the performance thereof is improved.

EXAMPLE 2

With reference to FIGS. 2A through 2G, a method for producing a tapered waveguide 102 in a second example according to the present invention will be described. FIGS. 2A and 2C through 2G respectively correspond to FIGS. 1A through 1F in the first example.

Figure 2A:
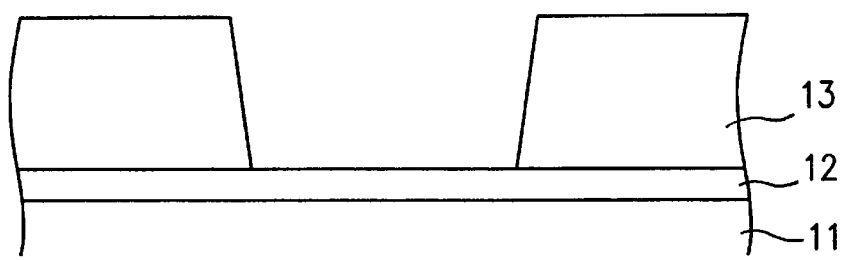
FIGS. 2A through 2G are cross sectional views illustrating a method for producing a tapered waveguide in a second example according to the present invention.
Figure 2B:
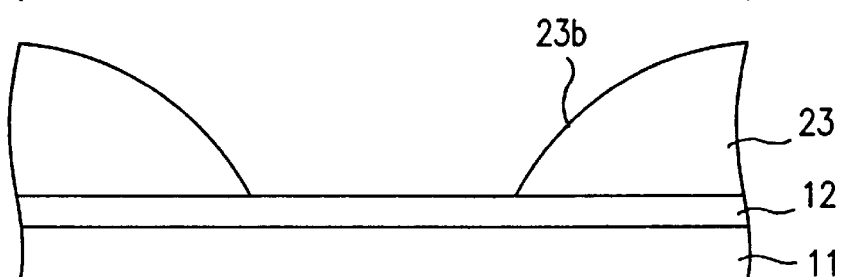
Figure 2C:
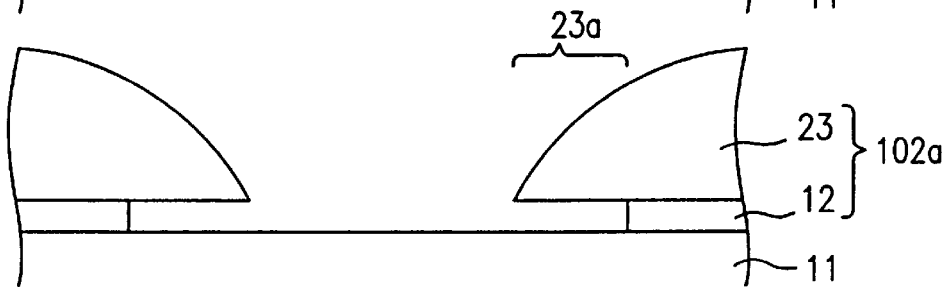
Figure 2D:
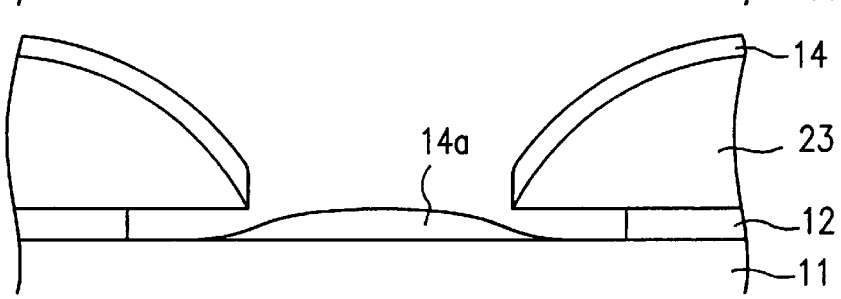
Figure 2E:
Figure 2F:
Figure 2G:
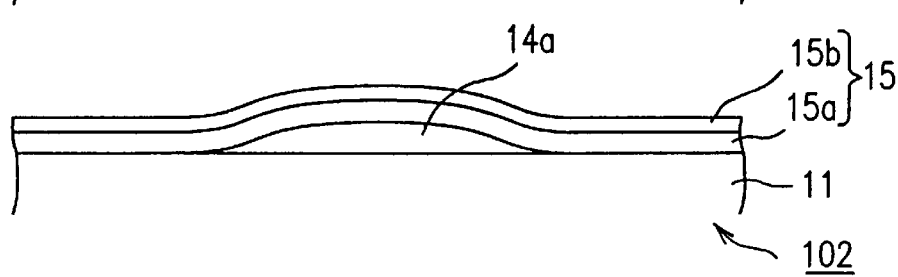

In FIG. 2C, reference numeral 102a denotes a shadow mask having a T-shaped cross section, which includes a photoresist layer 23 having an overhanging part 23a and the metal layer 12 for supporting the photoresist layer 23 above the substrate 11. The overhanging part 23a has an inclined surface.

The method in the second example utilizes that the photoresist layer 13 (FIG. 2A) is deformed by heating as shown in FIG. 2B. In more detail, the photoresist layer 13 having a prescribed pattern is formed on the metal layer 12 on the substrate 11, and the photoresist layer 13 is post-baked. By post-baking, an end of the photoresist layer 13 is deformed, and thus the photoresist layer 13 becomes a photoresist layer 23 having a curved top surface 23b as shown in FIG. 2C. The tip of the overhanging part 23a comes to a point.

In the case where the shadow mask 102a having such a structure is used, the adverse effect of the thickness of the overhanging part on the tapered part of the dielectric film 14a is eliminated. In other words, after the lift-off, the dielectric film 14a has a uniform thickness even in an area right below the overhanging part 23a. Thus, the resultant tapered waveguide 102 has a slowly curved and smooth tapered surface. Therefore, the optical characteristics of the tapered waveguide 102 are improved.

Figure 3:
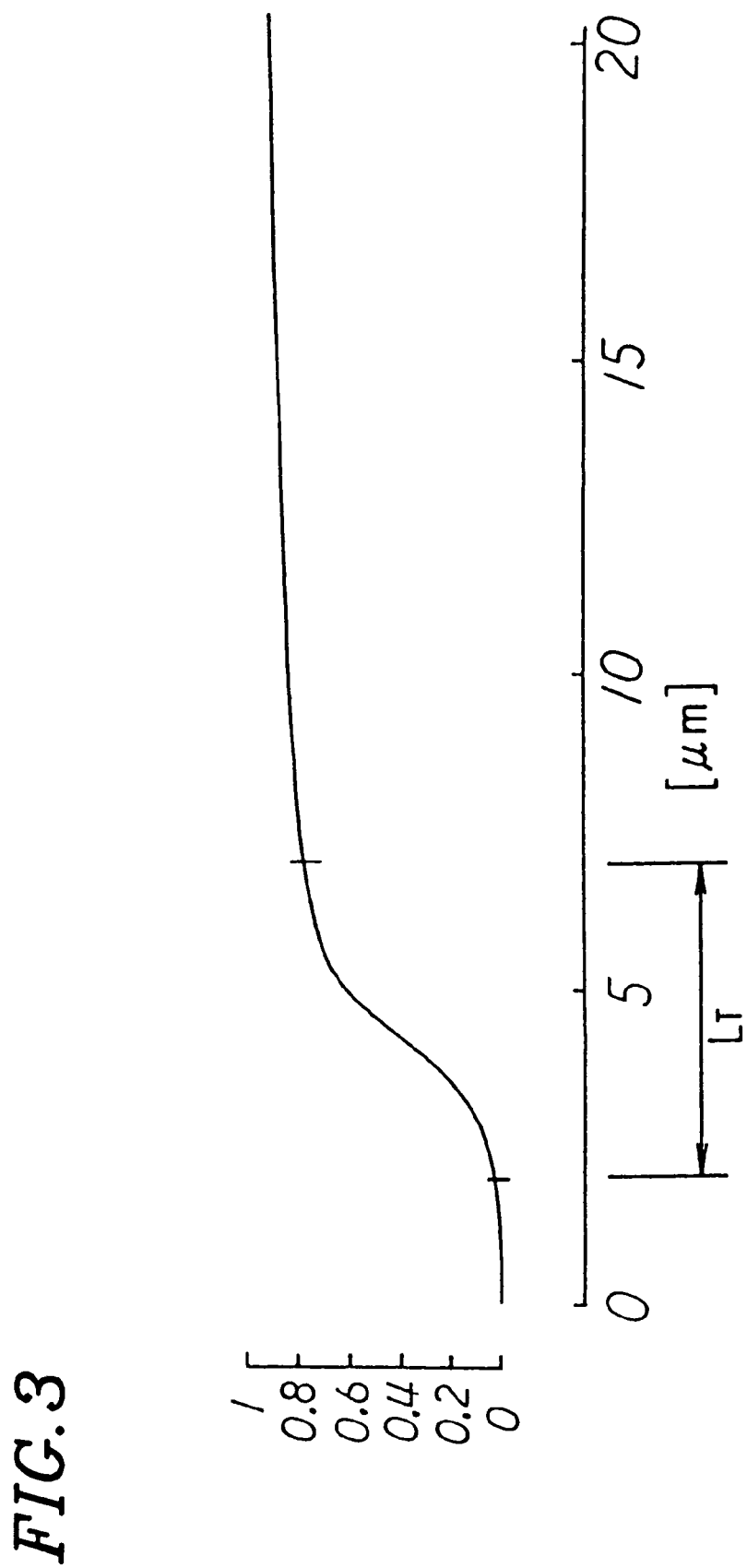
FIG. 3 is a graph illustrating the film thickness distribution of the tapered waveguide produced by the method in the second example.
Figure 4A:
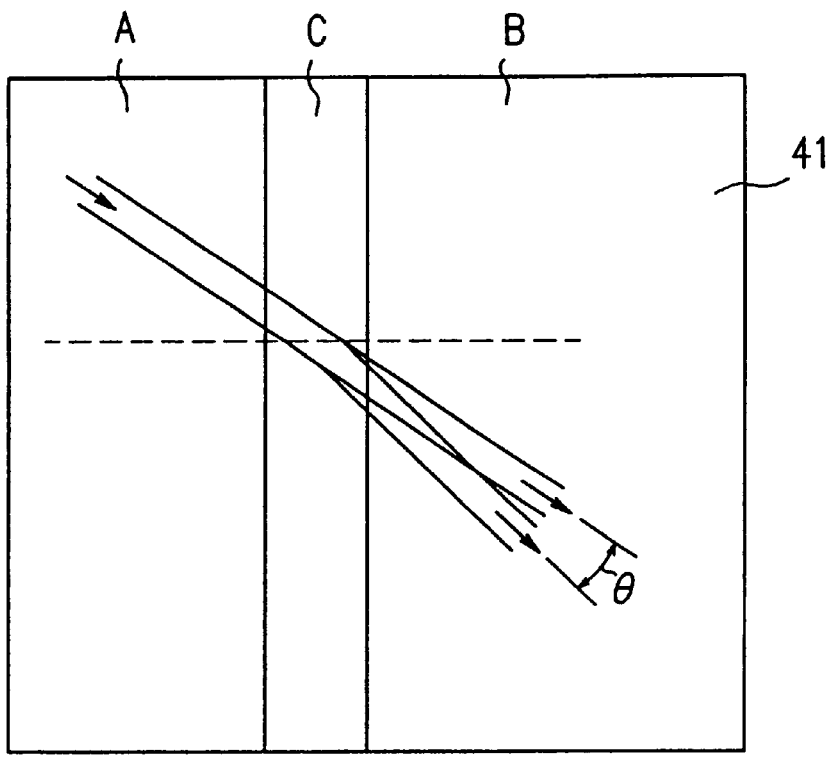
FIG. 4A is a plan view of a conventional mode splitter.
Figure 4B:
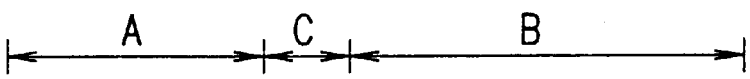
FIG. 4B is a cross sectional view thereof.
Figure 4B:
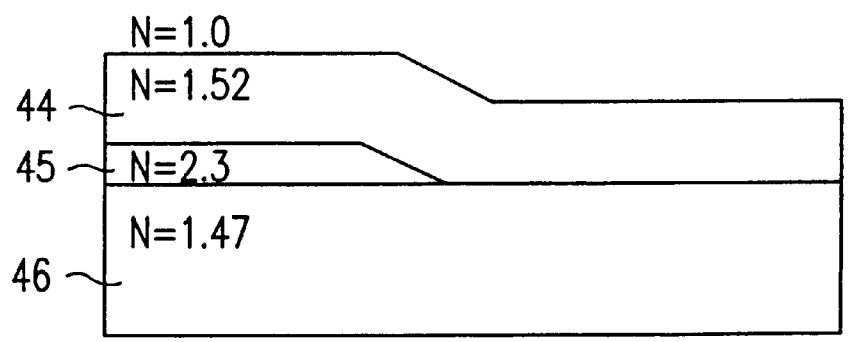
Figure 5A:
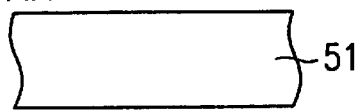
FIGS. 5A through 5I are cross sectional views illustrating a conventional method for producing a layer having a tapered part by etching.
Figure 5B:
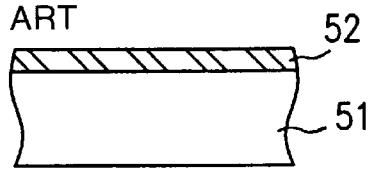
Figure 5C:
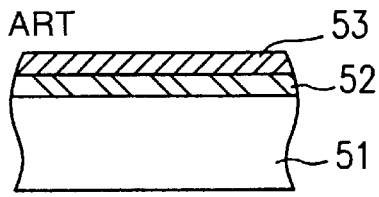
Figure 5D:
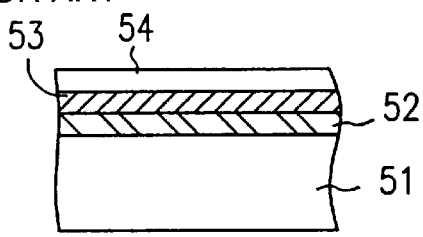
Figure 5E:
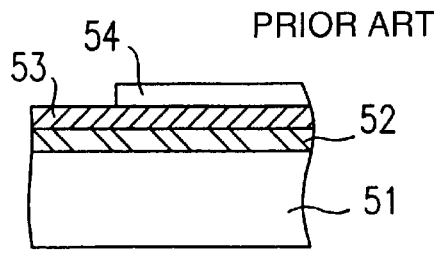
Figure 5F:
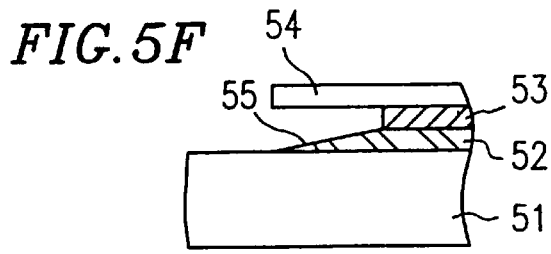
Figure 5G:
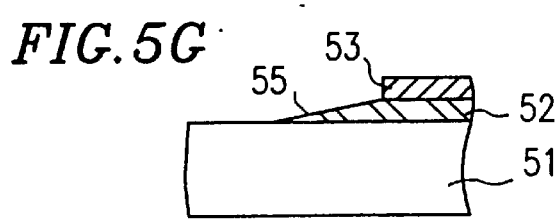
Figure 5H:
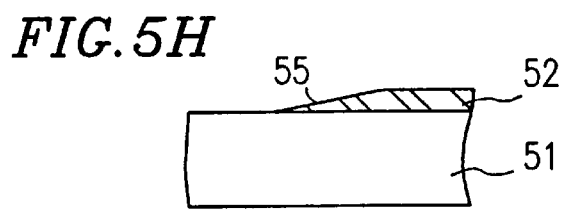
Figure 5I:
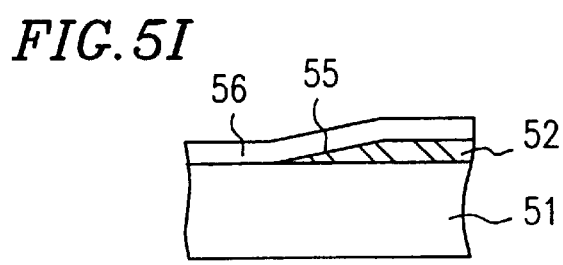
Figure 6A:
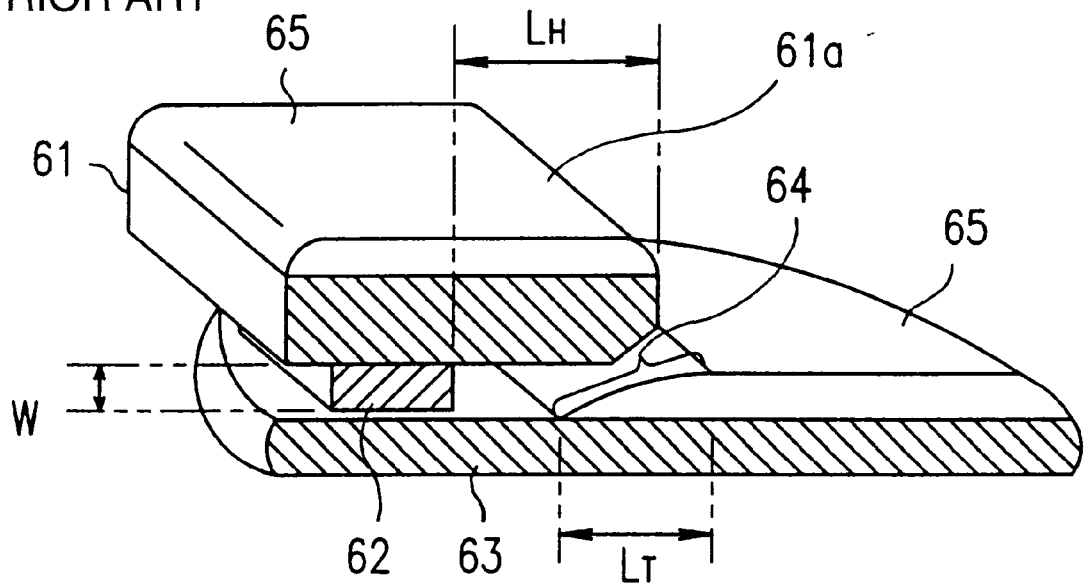
FIG. 6A is an isometric view of a conventional system for producing a layer having a tapered part by shadow masking.
Figure 6B:
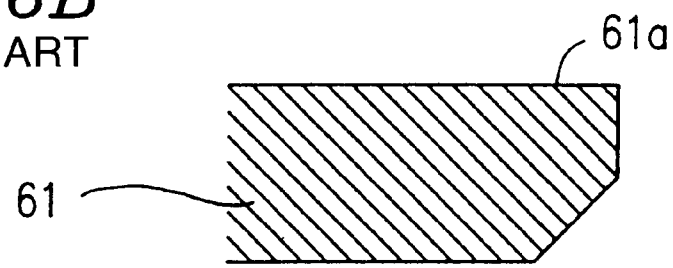
FIG. 6B is a cross sectional view of the shadow masking used for such a system.
Figure 7:
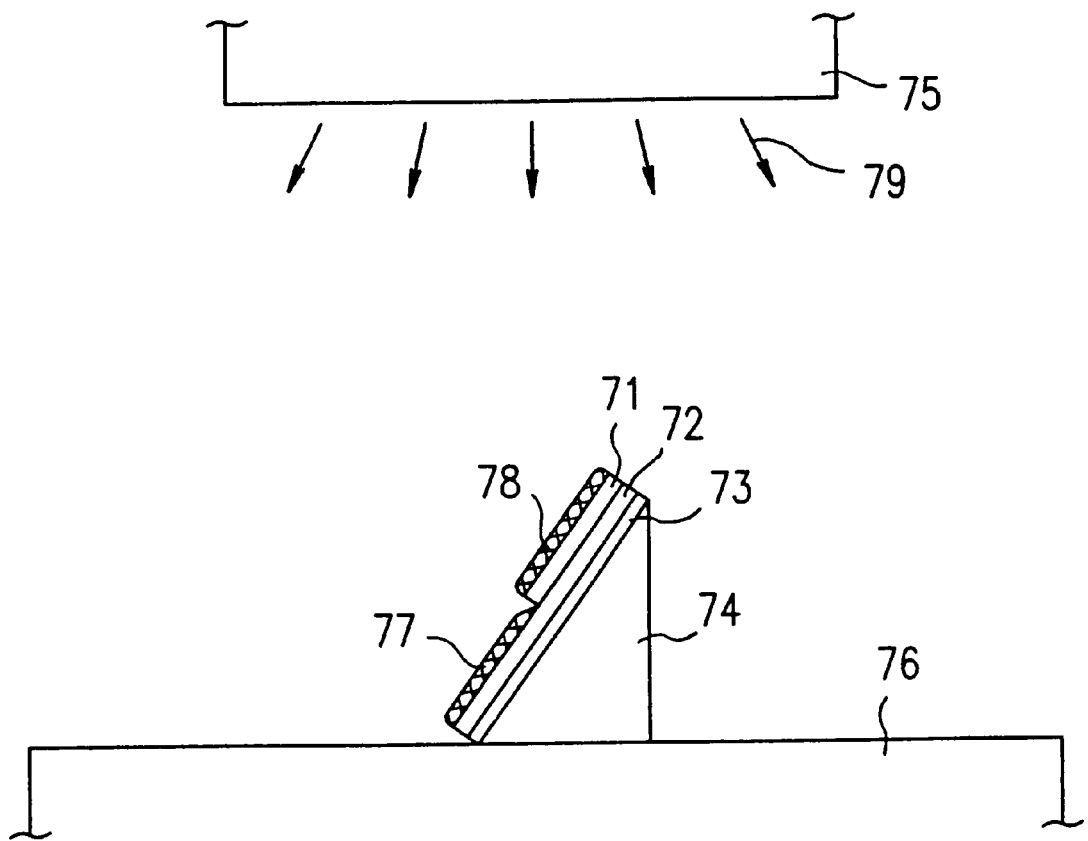
FIG. 7 is a cross sectional view of another system for producing a layer having a tapered part using shadow masking.
Figure 8A:
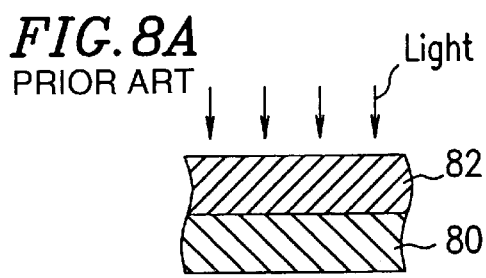
FIGS. 8A through 8H are cross sectional views illustrating still another method for producing a layer having a tapered part using shadow masking.
Figure 8B:
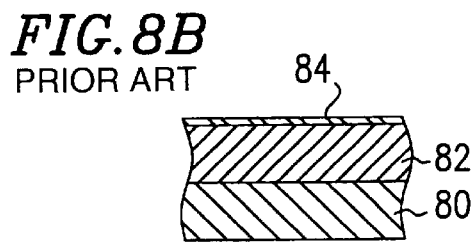
Figure 8C:
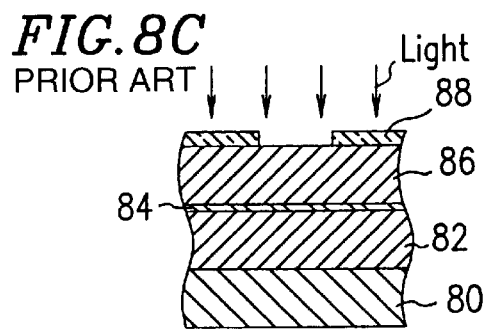
Figure 8D:
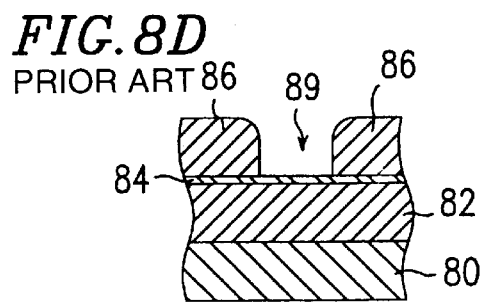
Figure 8E:
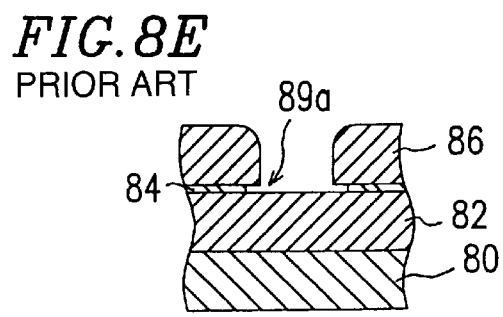
Figure 8F:
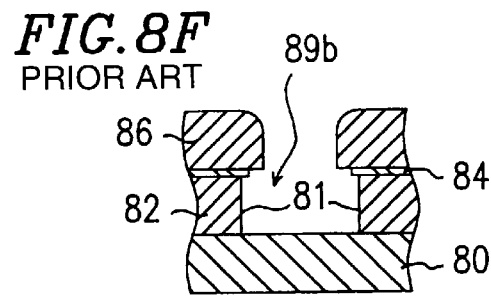
Figure 8G:
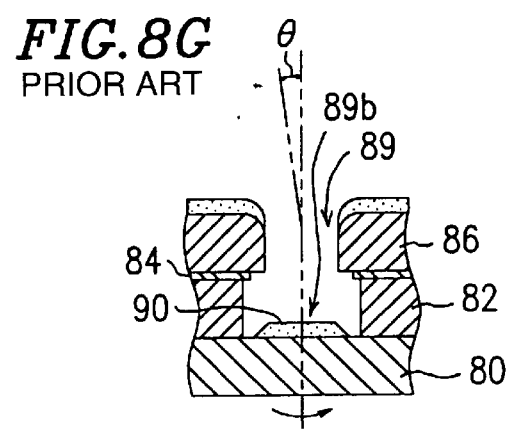
Figure 8H:
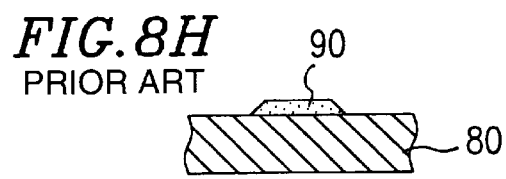

FIG. 3 is a graph illustrating the film thickness distribution of the dielectric film 14a formed by the method described in the second example. The distribution is obtained based on measurement results performed with a surface roughness meter. It is appreciated from the thickness change shown in FIG. 3 that the tapered part has a length LT of about 5 $\mu$m. The length of the tapered part can be changed by the film forming method of the dielectric film to be removed by lift-off, specifically, the area covered by the film-forming particles jumping from the film formation particle source or the thickness of the metal layer 12 supporting the overhanging part 23a. The thickness of the metal layer 12 is preferably in the range of 0.1 to 10 $\mu$m, more preferably in the range of 0.5 to 1 $\mu$m, and most preferably about 1 $\mu$m. In the case where the metal layer 12 is excessively thick, etching of the metal layer 12 requires an excessively long time and thus may result in the photoresist layer 13 on the metal layer 12 also being etched.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a tapered waveguide, comprising the steps of:
    forming an undercut shadow mask having an overhanging part on a substrate;
    causing film-forming particles to jump from above the shadow mask toward the substrate, thereby forming a dielectric film having a tapered part on the substrate;
    removing the shadow mask together with the film-forming particles thereon by lift-off; and
    forming an optical waveguide layer on the substrate so as to cover the dielectric film having the tapered part,
    wherein the undercut shadow mask includes a photoresist layer having an overhanging part and a metal layer having a thickness of in the range of about 0.1 to 10 $\mu$m for supporting the photoresist layer above the substrate.

2. A method for producing a tapered waveguide according to claim 1, wherein the metal layer has a thickness of about 1 $\mu$m.

3. A method for producing a tapered waveguide according to claim 1, wherein the photoresist layer has a thickness of in the range of 0.5 to 50 $\mu$m.

4. A method for producing a tapered waveguide according to claim 3, wherein the photoresist layer has a thickness of about 10 $\mu$m.

5. A method for producing a tapered waveguide according to claim 1, further comprising the step of thermally deforming the photoresist layer to reduce the thickness of a tip of the overhanging part and to slowly curve a top part of the overhanging part.

6. A method for producing a tapered waveguide according to claim 1, wherein the step of forming the shadow mask includes the steps of:
    forming the metal layer on the substrate;
    forming the photoresist layer having the overhanging part on the metal layer; and
    etching the metal layer by an etchant formed of one of an acid and a mixture of an acid, using the photoresist layer as a mask.

7. A method for producing a tapered waveguide according to claim 1, wherein the metal layer is formed of aluminum.

8. A method for producing a tapered waveguide according to claim 7, wherein the metal layer is formed of aluminum and the etchant is formed on a material mainly containing phosphoric acid.

9. A method for producing a tapered waveguide according to claim 1, wherein the step of forming the dielectric film includes the steps of:

placing the substrate having the shadow mask thereabove on a movable sample table; and causing the film-forming particles to jump toward the sample table while moving the sample table so as to cause the film-forming particles to jump toward the substrate in random directions.

10. A method for producing a tapered waveguide, comprising the steps of:

forming a metal layer on a substrate;

forming a patterned photoresist layer on the metal layer;

etching the metal layer by an etchant formed of one of an acid and a mixture of an acid, using the photoresist layer as a mask, thereby forming an undercut shadow mask having an overhanging part on the substrate;

causing film-forming particles to jump from above the shadow mask toward the substrate, thereby forming a dielectric film having a tapered part on the substrate;

removing the shadow mask together with film-forming particles thereon by lift-off; and forming an optical waveguide layer on the substrate so as to cover the dielectric film having the tapered portion.

* * * * *